United States Patent [19]

Kobayashi et al.

[11] Patent Number: 5,341,358
[45] Date of Patent: Aug. 23, 1994

[54] OPTICAL RECORDING MEDIUM AND OPTICAL RECORDING METHOD USING THE SAME

[75] Inventors: Hideo Kobayashi; Osamu Ueno; Kiichi Ueyanagi, all of Ebina, Japan Japan

[73] Assignee: Fuji Xerox Co., Ltd., Tokyo, Japan

[21] Appl. No.: 757,058

[22] Filed: Sep. 9, 1991

[30] Foreign Application Priority Data

Sep. 11, 1990 [JP] Japan .................... 2-239002

[51] Int. Cl.$^5$ .................................................. G11B 7/00
[52] U.S. Cl. .................................. 369/100; 369/275.2; 430/270
[58] Field of Search ............... 369/100, 275.2, 275.3, 369/275.4, 275.5; 430/270

[56] References Cited

U.S. PATENT DOCUMENTS

| | | | |
|---|---|---|---|
| 4,465,783 | 10/1990 | Siol et al. | 369/100 |
| 4,547,872 | 10/1985 | Henmi et al. | 369/116 |
| 4,710,911 | 12/1987 | Yamada et al. | 369/100 |
| 4,773,059 | 9/1988 | Minemura et al. | 369/100 |
| 4,773,060 | 9/1988 | Shimada et al. | 369/100 |
| 4,839,861 | 6/1989 | Ikegawa et al. | 369/100 |
| 4,860,274 | 8/1989 | Kobayashi | 369/100 |
| 4,939,717 | 7/1990 | Ohno et al. | 369/275.2 |
| 5,128,099 | 7/1992 | Strand et al. | 420/579 |
| 5,187,052 | 2/1993 | Maeda et al. | 430/495 |

FOREIGN PATENT DOCUMENTS

| | | |
|---|---|---|
| 0184452 | 6/1986 | European Pat. Off. . |
| 0306925A1 | 9/1988 | European Pat. Off. . |
| 0294932A3 | 12/1988 | European Pat. Off. . |
| 0347801A3 | 12/1989 | European Pat. Off. . |
| 2195811A | 4/1988 | United Kingdom . |

OTHER PUBLICATIONS

"Lehrbuch Der Anorganischen Chemie," by A. F. Holleman et al., Walter De Gruyter & Co., Berlin 1960, pp. 466–471.

*Primary Examiner*—Paul M. Dzierzynski
*Assistant Examiner*—Kiet T. Nguyen
*Attorney, Agent, or Firm*—Finnegan, Henderson, Farabow, Garrett & Dunner

[57] ABSTRACT

An optical recording medium having a layer of recording material provided on a substrate, the material having an optical property which is changed reversibly by means of light or heat, so that writing/reproducing or writing/reproducing/erasing of information is performed by using the reversible change of the optical property of the recording material layer. The recording material is composed of a plurality of elements and is capable of taking, as a melt state thereof, a selected one of a single phase state and a two-phase coexistent state. An optical recording method for performing writing-/reproducing/erasing of information uses a reversible change of an optical property of the recording material layer by irradiating the recording material layer with a high-power light beam so as to melt it into a single phase state and then cooling the recording material layer so as to form a phase-changed portion corresponding to a recording state or an erasing state. The recording material layer is irradiated with a low-power light beam so as to be melted into a two-phase coexistence state and then cooled so as to form a phase-changed portion corresponding to an erasing state or a recording state.

5 Claims, 18 Drawing Sheets

LASER POWER

LASER POWER

OPTICAL RECORDING MEDIUM AND OPTICAL RECORDING METHOD USING THE SAME

BACKGROUND OF THE INVENTION

The present invention relates to a rewritable optical recording medium for performing information writing/reproducing or information writing/reproducing/erasing by utilizing a change of the optical property of a portion of a recording material layer caused by radiation of a light beam such as a laser beam to the recording material layer, and relates also to an optical recording method using such a rewritable optical recording medium. In particular, the present invention relates to an improvement of an optical recording medium in which a signal having four values at the maximum can be recorded, the erasability, the C/N ratio, etc. can be improved, and information can be written or rewritten at a high speed, and relates also to an improvement of an optical recording method using such an optical recording medium.

Heretofore, an optomagnetic recording medium has been proposed as a rewritable optical recording medium for performing information recording by utilizing a light beam such as a laser beam, or the like, and it has been partly used in practice. That is, this system is a system in which information is written by inverting the direction of magnetization of a recording material layer by application of light energy and magnetic field to the recording material layer, and, on the other hand, a reproduction signal is attained by detecting a difference in Faraday rotation angle or Kerr rotation angle caused depending on the direction of magnetization.

Such a system, however, can be adapted to nothing but a limited field, because there is no practical method for performing rewriting within a range of one sector.

On the other hand, a so-called phase changing type optical recording medium utilizing a phase change between "a crystalline phase" and "an amorphous phase" is in a way of research as another rewritable optical recording mediums. That is, this type system is carried out, as shown in FIG. 19, through the steps of: changing a part of a crystalline state (cr) recording material layer (a) into an amorphous state (am) by rapidly cooling the part after melting the part through radiating a high-power laser beam to the part, in general, to thereby utilize the amorphous state as a recording state; and, on the other hand, as shown in FIG. 20, returning the amorphous state to the crystalline state (cr) by gradually cooling the part after melting the part through radiating a low-power laser beam to utilize the crystalline state as an erasing state.

In this type of system, not only information rewriting can be made within a range of one sector by using two light beams (that is, recorded information is erased through one light beam and then information is recorded through the other light beam) but overwriting can be made by using one light beam (that is, information simultaneous rewriting for performing writing/erasing while selectively switching the power of one beam can be made). Accordingly, this type of system has an advantage in that it can be applied to various fields.

However, although a few materials used as the recording materials adapted to the phase changing type optical recording medium are short in the crystallizing time, most materials are slow in the crystallizing speed (long in the crystallizing time, for example, 100 ns or more). Accordingly, a long time is required for easing recorded information, so that there arises a problem in that the rewriting speed is slow.

On the other hand, to solve the problem, a recording method using a phase change between "a crystalline phase" and "a mixture phase in which crystals are mixed in amorphous" instead of the conventional phase change between "a crystalline phase" and "an amorphous phase" has been proposed in Japanese Patent Unexamined Publication No. Sho-64-72341. That is, the proposed recording method is a method in which the erasing time is effectively shortened by making the "mixture phase" instead of the "amorphous phase" correspond to a recording state.

In the improved method in which the "mixture phase" is made to correspond to a recording state, however, a problem arises in that the erasing time cannot be shortened greatly while it can be shortened slightly compared with the conventional method in which the phase is changed from "an amorphous phase" to "a crystalline phase". Another problem arises in that the erasing time is still long in the case of using a recording material excellent in reservation stability (that is, high in the crystallizing temperature). A further problem arises in that deterioration in the erasability and in the C/N ratio is observed because the "mixture phase" is unstable and, accordingly, the signal level is unstable.

Further, both in the conventional method utilizing the phase change between "a crystalline phase" and "an amorphous phase" and in the improved method utilizing the phase change between "a crystalline phase" and "a mixture phase", a signal having values more than two values cannot be recorded. There arises a problem in that the amount of information recorded in one sheet of the optical recording medium is limited.

SUMMARY OF THE INVENTION

The present invention has been attained in view of the aforementioned problems, and an object thereof is to provide an optical recording medium in which a signal having four values at the maximum can be recorded, the erasability and the C/N ratio can be improved, and information writing or rewriting can be made at a high speed, and to provide an optical recording method using the optical recording medium.

According to a first aspect of the present invention, in an optical recording medium having a layer of recording material provided on a substrate, the material having an optical property which is changed reversibly by means of light, heat or the like, so that writing/reproducing or writing/reproducing/erasing of information is performed by using the reversible change of the optical property of the recording material layer, the recording material includes a composition being composed of a plurality of elements and being capable of taking, as a melt state thereof, a selected one of a single phase state and a two-phase coexistent state.

According to a second aspect of the present invention, in an optical recording method for performing writing/reproducing/erasing of information by using a reversible change of an optical property of a layer of recording material provided on a substrate caused by means of light, heat or the like, the recording material includes a composition being composed of a plurality of elements and being capable of taking, as a melt state thereof, a selected one of a single phase state and a two-phase coexistent state; the recording material layer is irradiated with a high-power light beam so as to be melted into a single phase state and then cooled so as to form a phase-changed portion corresponding to a recording state or an erasing state; and the recording material layer is irradiated with a low-power light beam so as to be melted into a two-phase coexistence state and then cooled so as to form a phase-changed portion corresponding to an erasing state or a recording state.

In the second aspect of the present invention, an amorphous portion may be formed by rapidly cooling the single phase recording material layer and, on the other hand, an amorphous portion may be formed by rapidly cooling the two-phase coexistence recording material layer. That is, by adjusting the cooling condition, there occur two cases which are different in reflectivity difference depending on the difference in initial state. As a result, an optical recording can be made by making the two states correspond to a recording state and an erasing state respectively. Also in the present invention, a crystallized portion may be formed by gradually cooling the single phase recording material layer and, on the other hand, a crystallized portion may be formed by gradually cooling the two-phase coexistence recording material layer. Also in this case, a reflectivity difference caused by a initial state difference is produced between the two. As a result, an optical recording can be made in the same manner as described above.

According to a third aspect of the present invention, high-speed writing or rewriting is attained by setting the cooling condition in the method of the second aspect of the present invention to rapid cooling treatment.

A fourth aspect of the present invention provides a method adapted to the case where the composition constituting the recording material is low in stability of the amorphous phase thereof (that is, low in the crystallizing temperature) such as Bi—Ga or Tl—Ga. According to the fourth aspect, improvement in stability of reservation of recorded information is attained by setting the cooling condition in the method of the second aspect of the present invention to gradual cooling treatment. In this method, the amorphous region different in energy level from the crystalline region does not coexist with the latter in the recording material layer, so that improvement in stability of reservation of recorded information can be attained.

A fifth aspect of the present invention provides a method adapted to the case where the composition constituting the recording material is high in crystallizing speed (for example, in the case where the crystallizing time is not longer than 500 ns) such as Zn—Bi or Zn—Pb. According to the fifth aspect, both a high writing or rewriting speed and an improvement in stability of reservation of recorded information are attained by setting the cooling condition in the method of the second aspect of the present invention to rapid cooling treatment and by selecting a composition having a high crystallizing speed as the recording material.

According to first through fifth aspects of the present invention, the recording material layer is heated to form a melt state by radiating at least one light beam at the time of information writing/erasing. Accordingly, the invention has an advantage in that the history before rewriting can be completely erased.

DETAILED DESCRIPTION OF THE PREFERRED EMBODIMENTS

Preferred embodiments of the present invention will be described with reference to the accompanying drawings.

Figure 2:
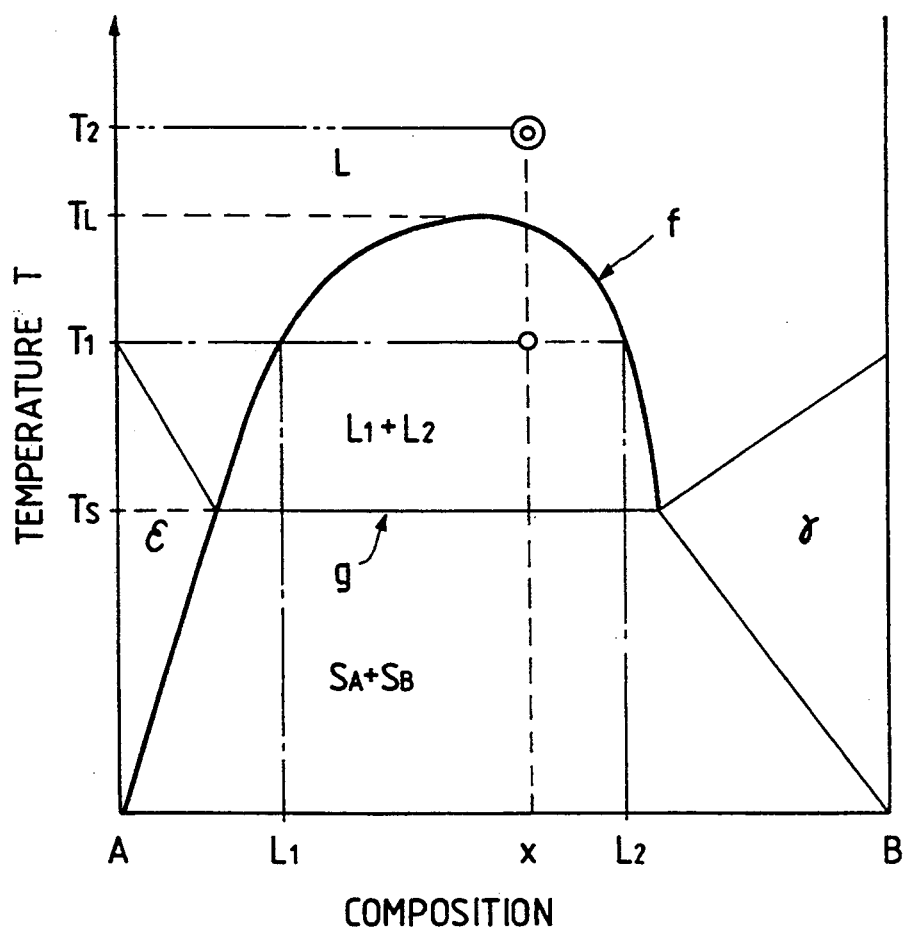
FIG. 2 is a schematic phase diagram for explaining compositions adapted to the present invention.

First, the composition for forming a recording material in this invention will be described with reference to the state view of FIG. 2. That is, FIG. 2 is a state view of a two-element composition consisting of an element A and an element B. In the drawing, the composition AB in a temperature range of not lower than the liquid phase line f is in a single phase L melt state in which the element A and the element B are mixed uniformly. On the other hand, the composition AB in a temperature range of from the solid phase line g to the liquid phase line f is in an two-phase coexistence ($L_1+L_2$) melt state in which the element A and the element B are not mixed uniformly and respectively have concentrations $L_1$ and $L_2$ (in the case of temperature $T_1$).

Figure 5:
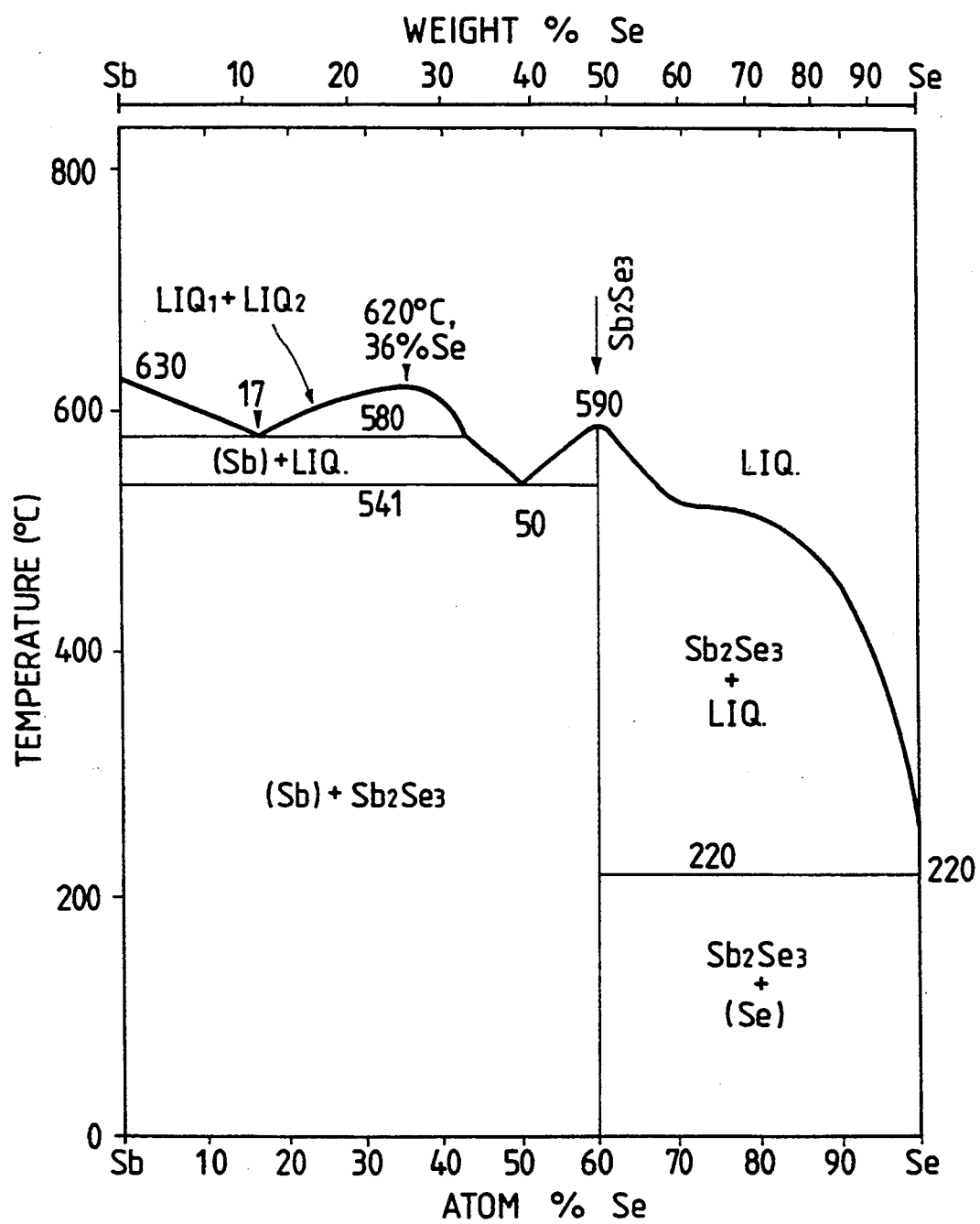
Figure 6:
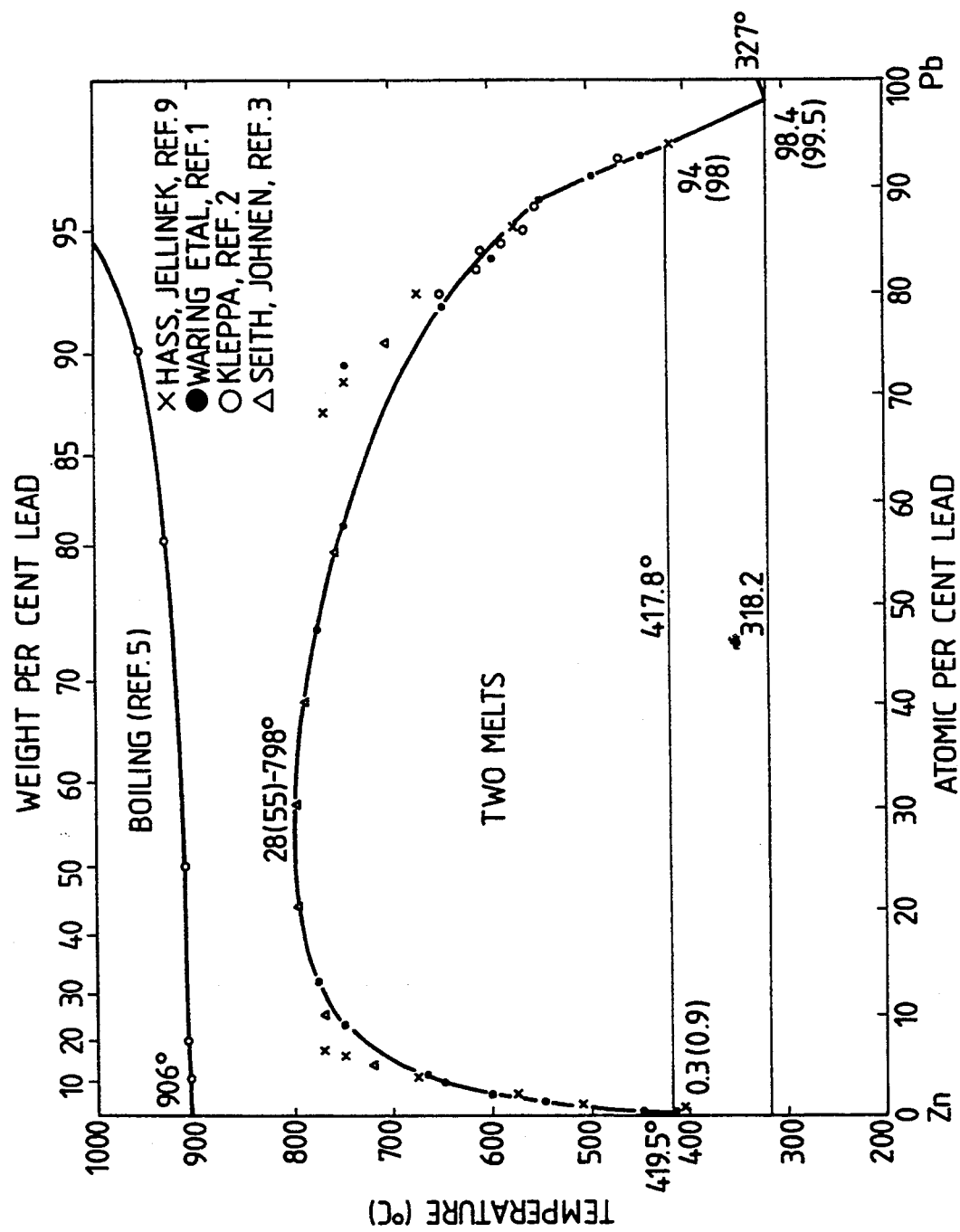
Figure 7:
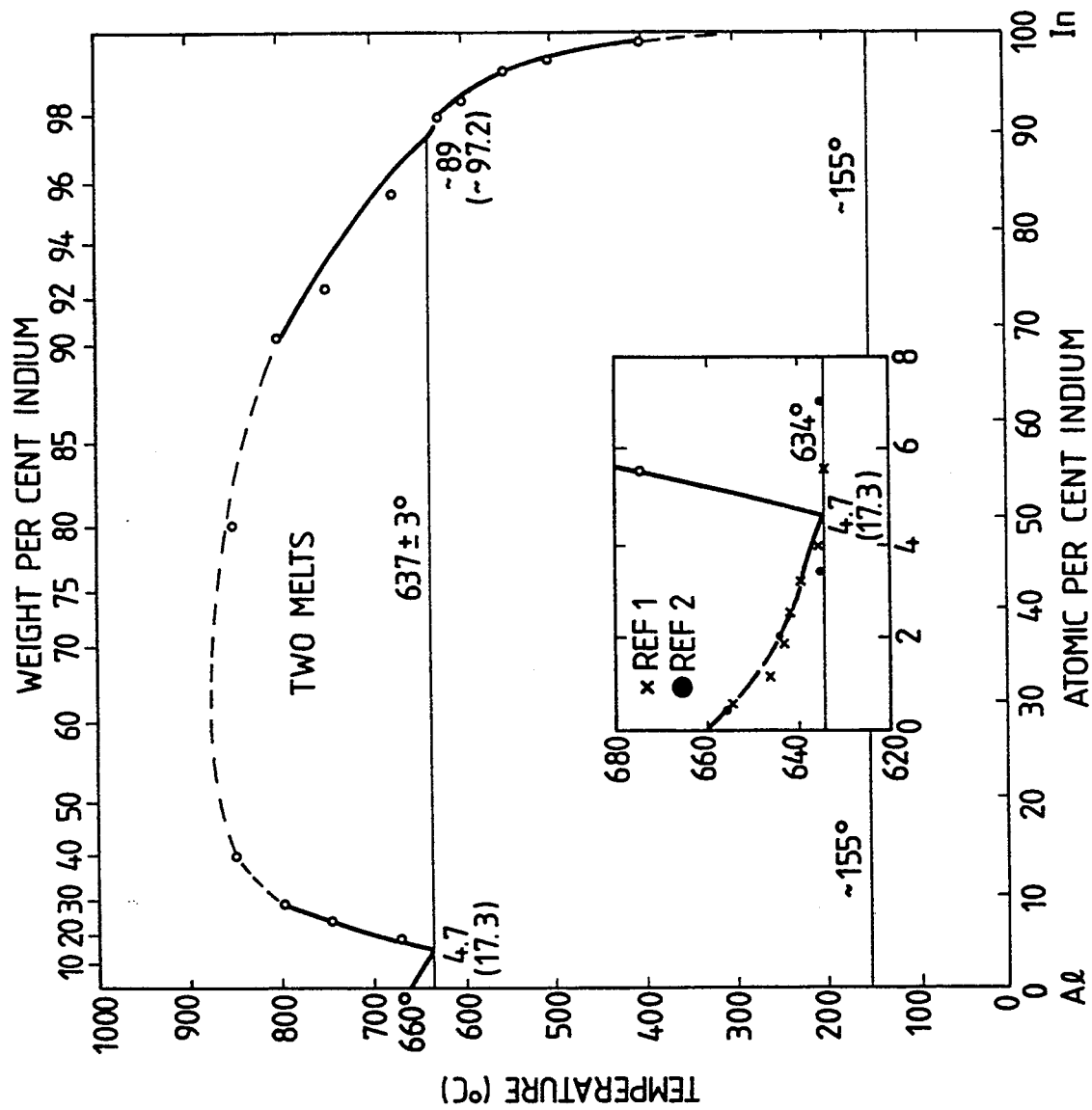
Figure 8:
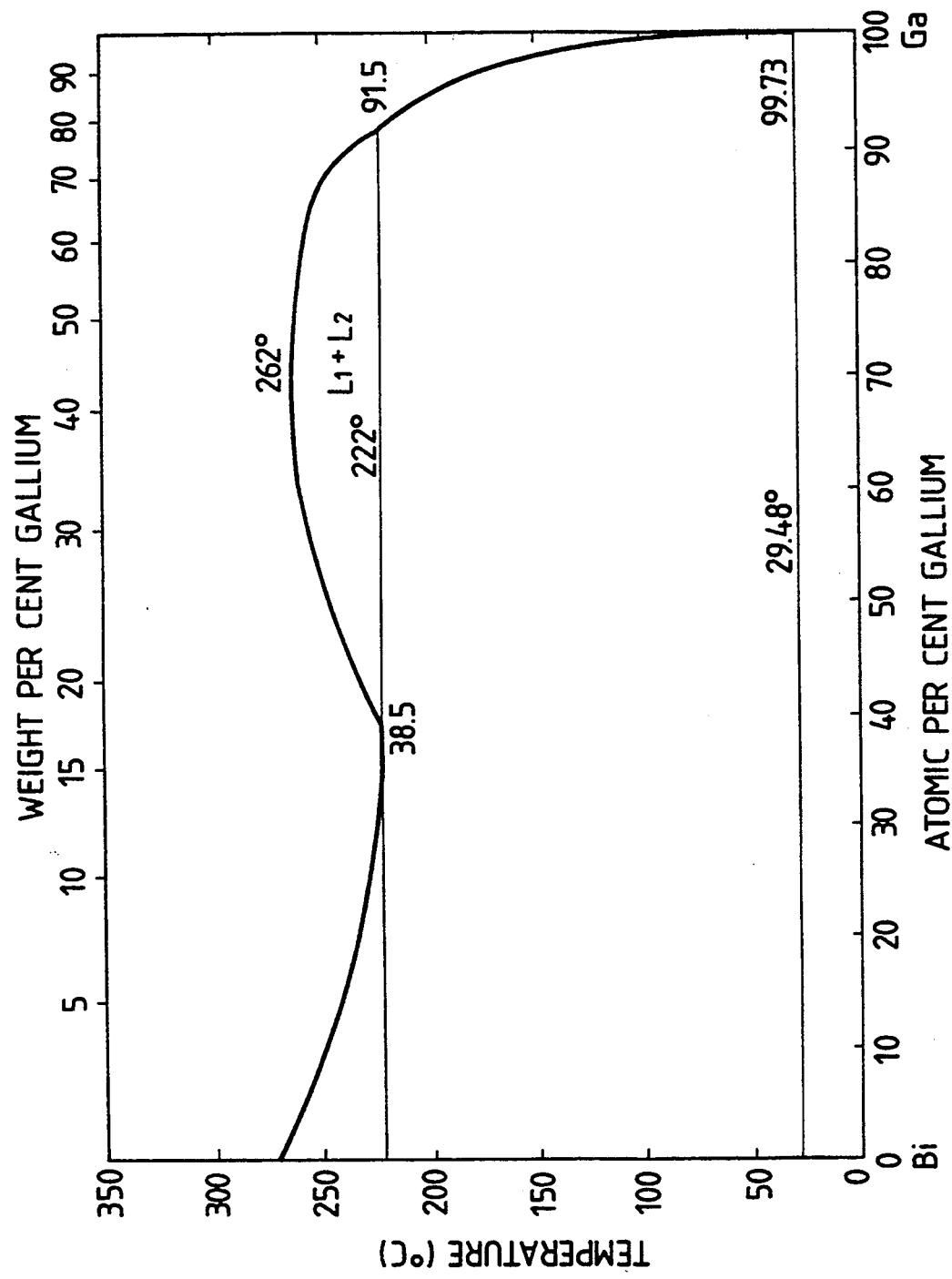
Figure 9:
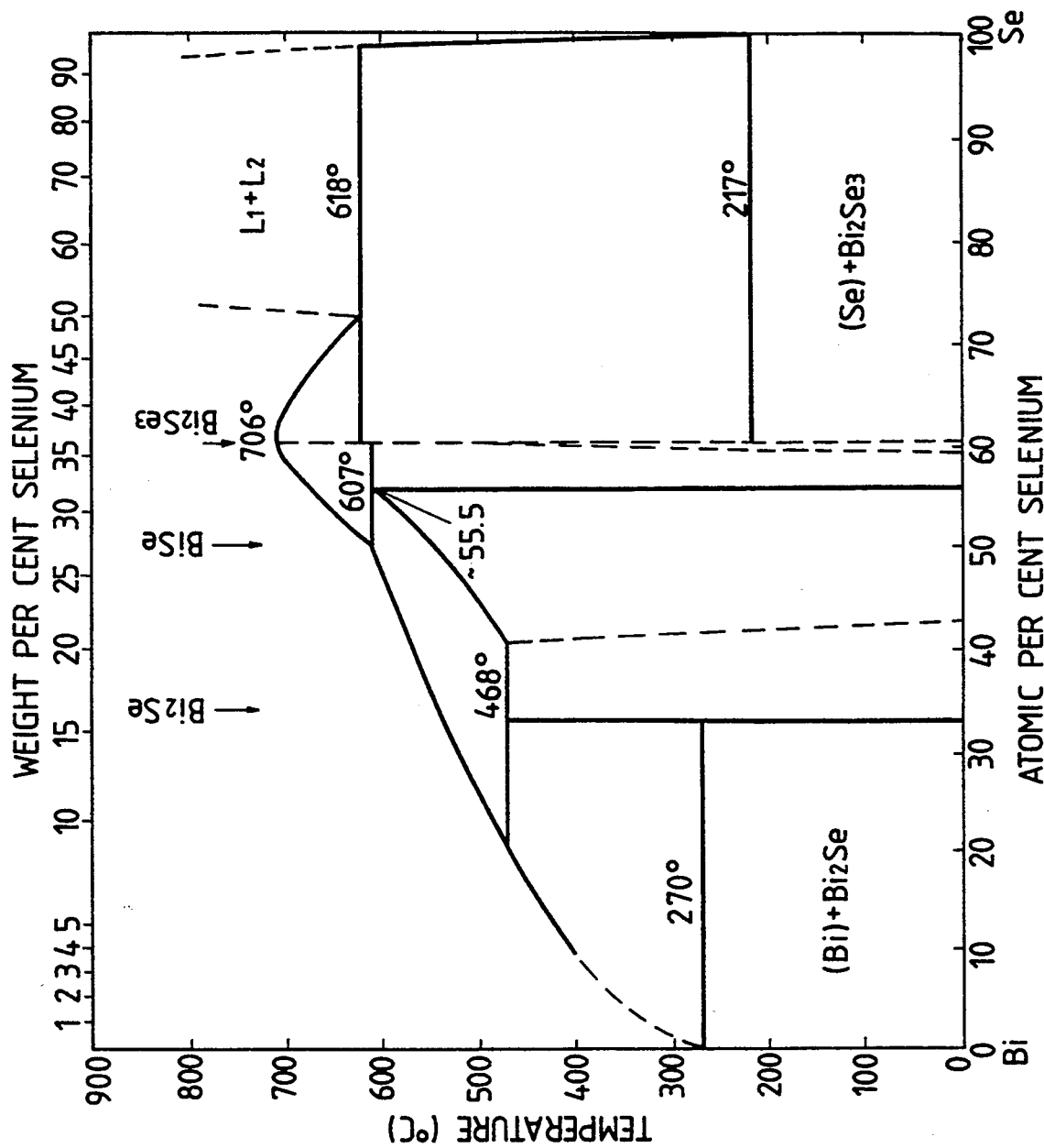
Figure 10:
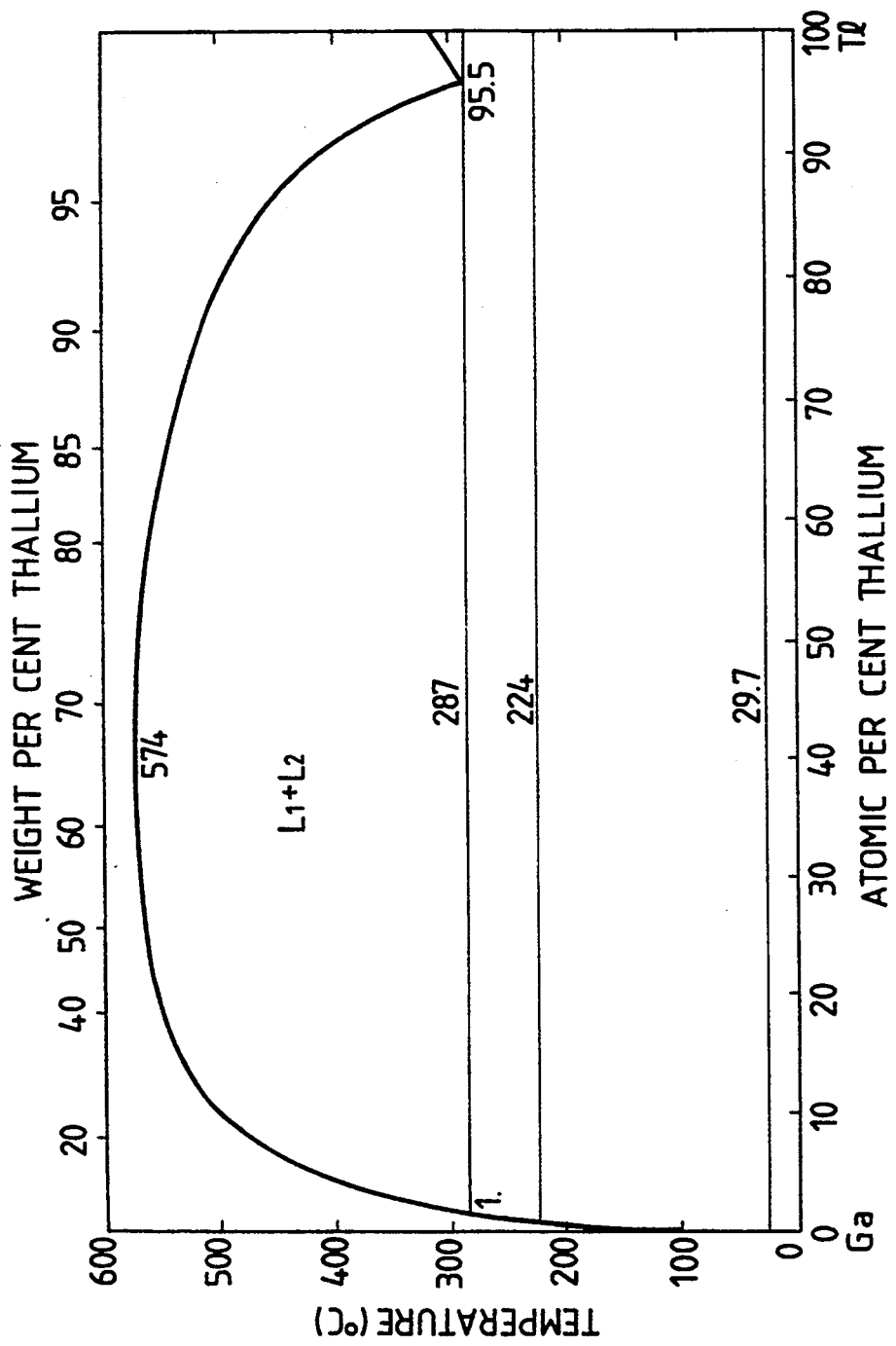
Figure 11:
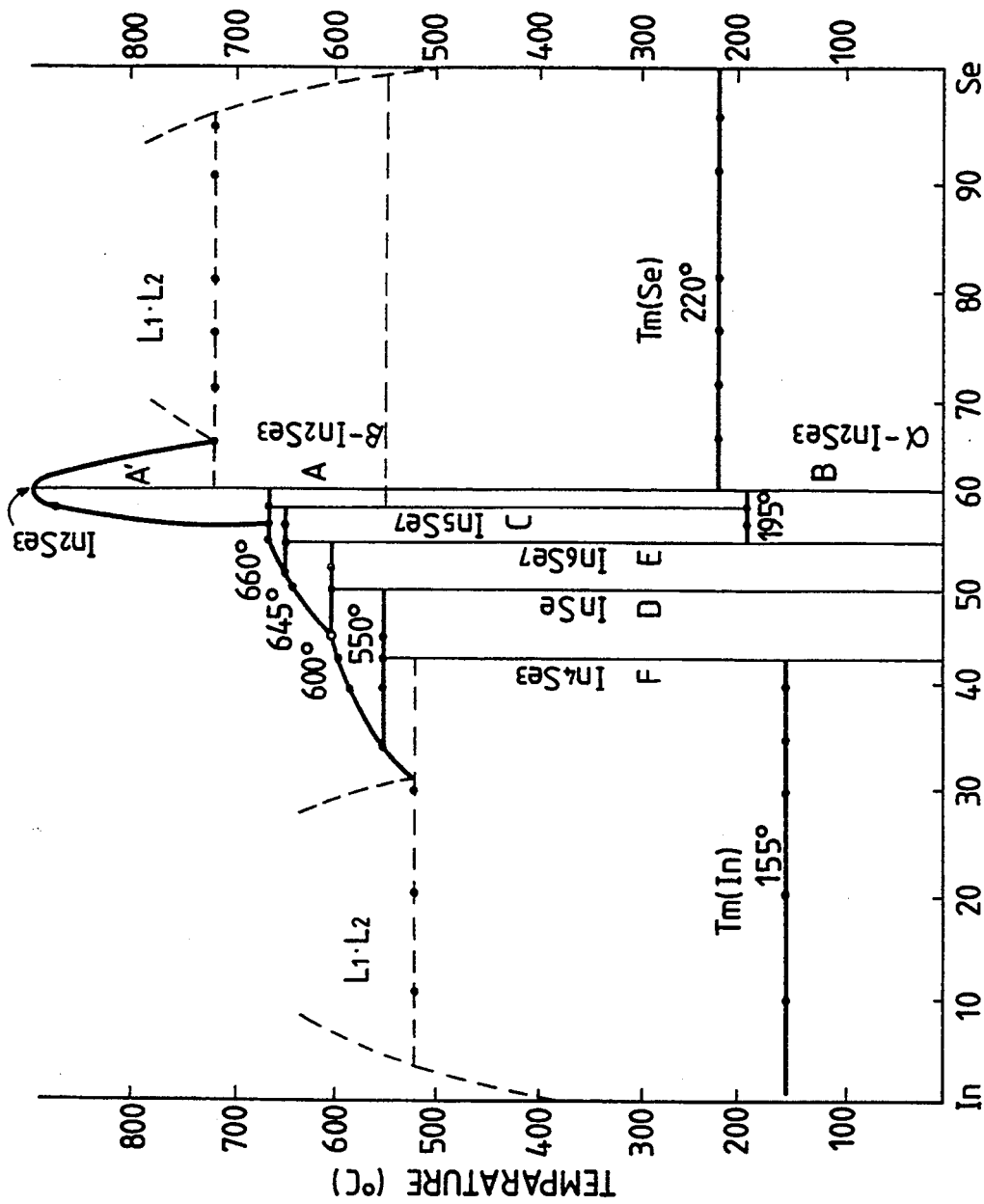
Figure 12:
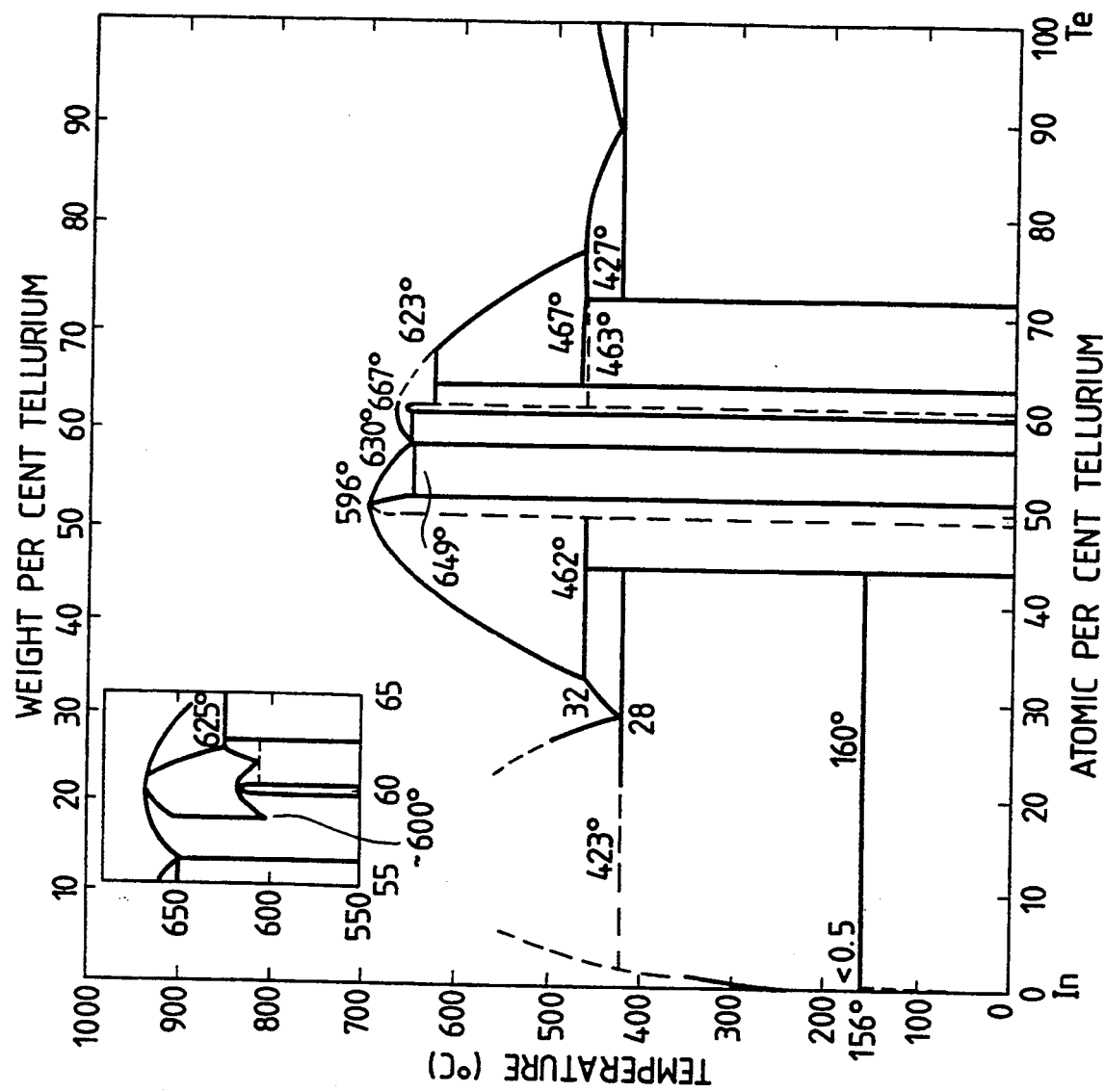
Figure 13:
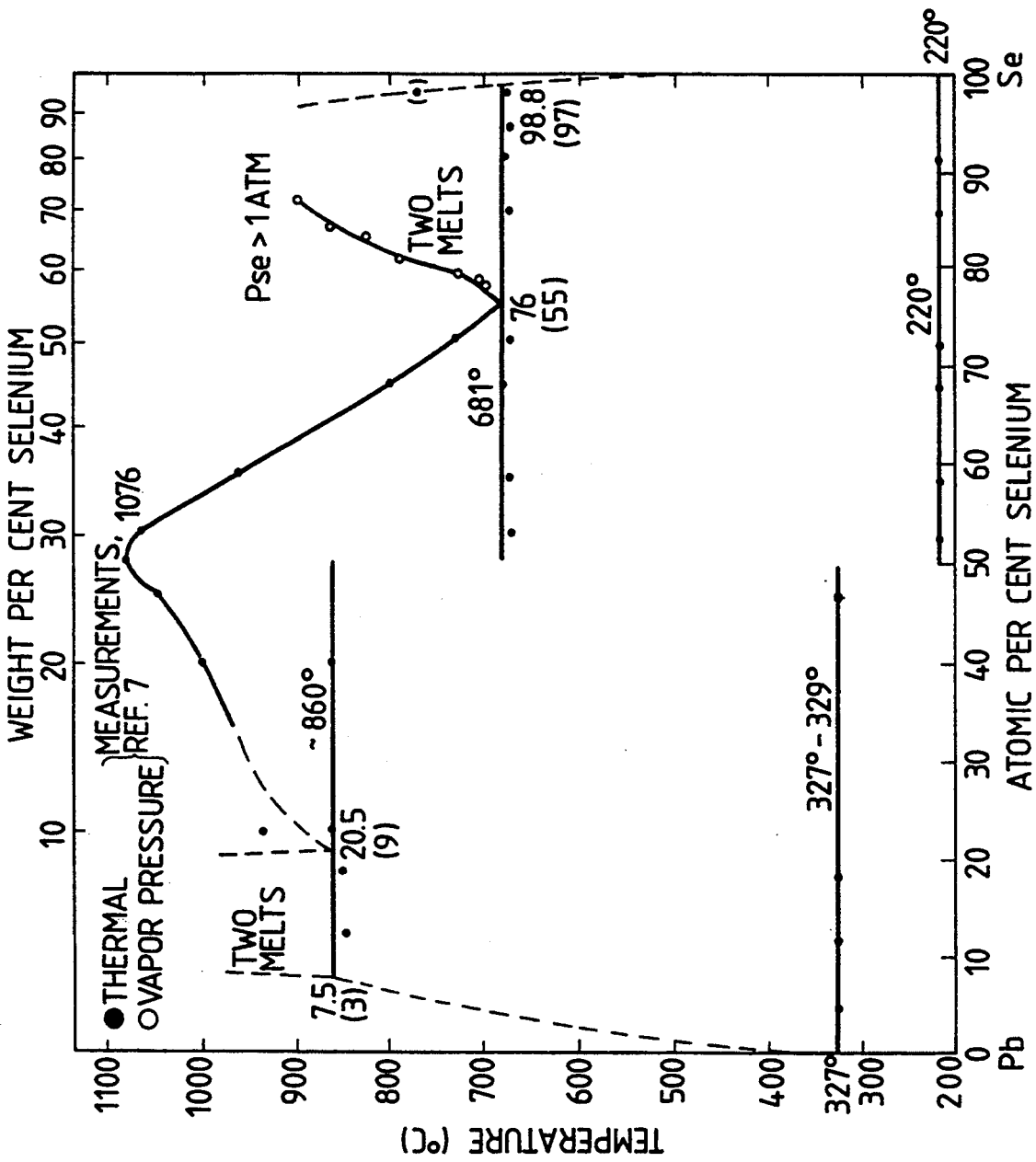
Figure 14:
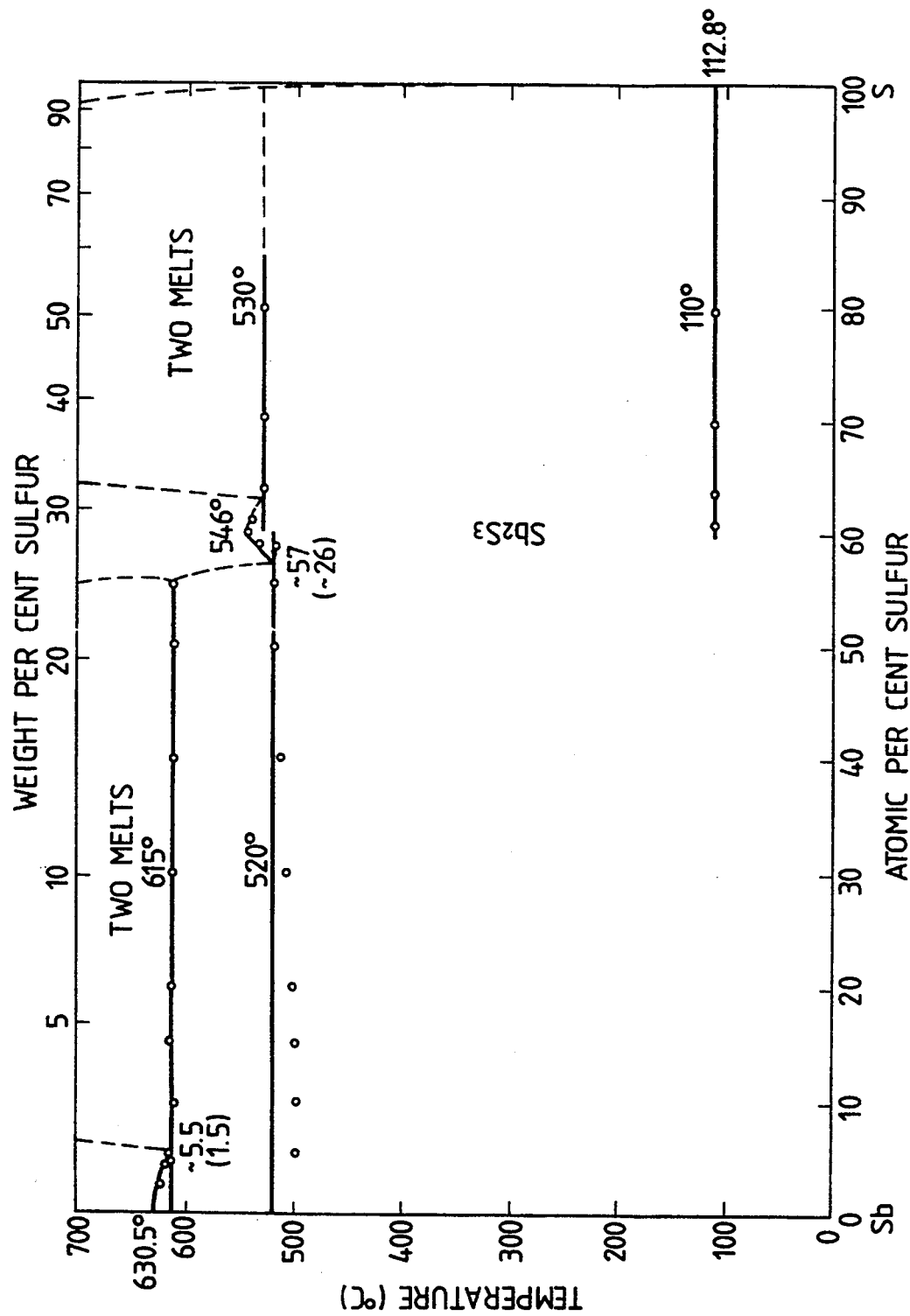
Figure 15:
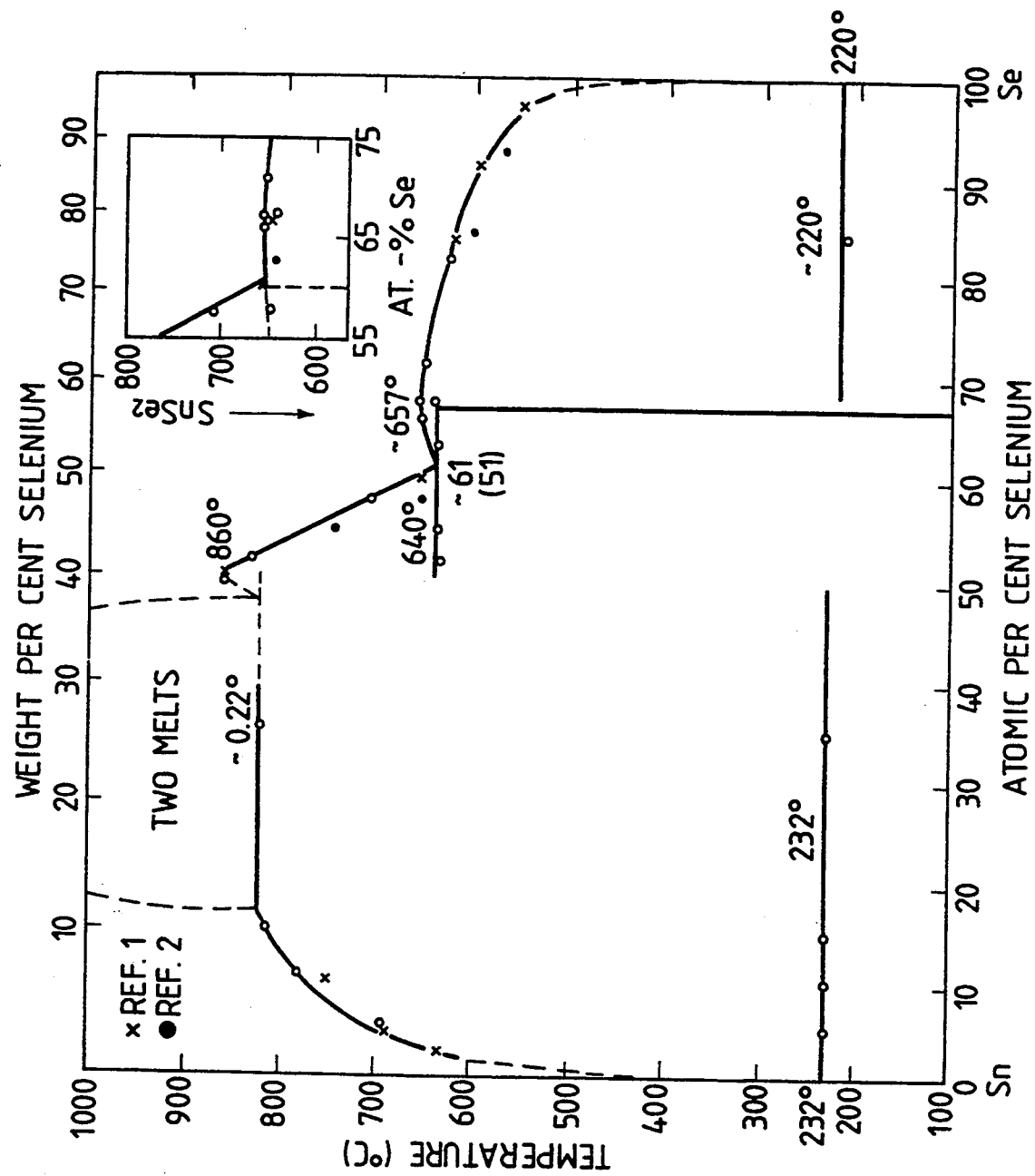
Figure 16:
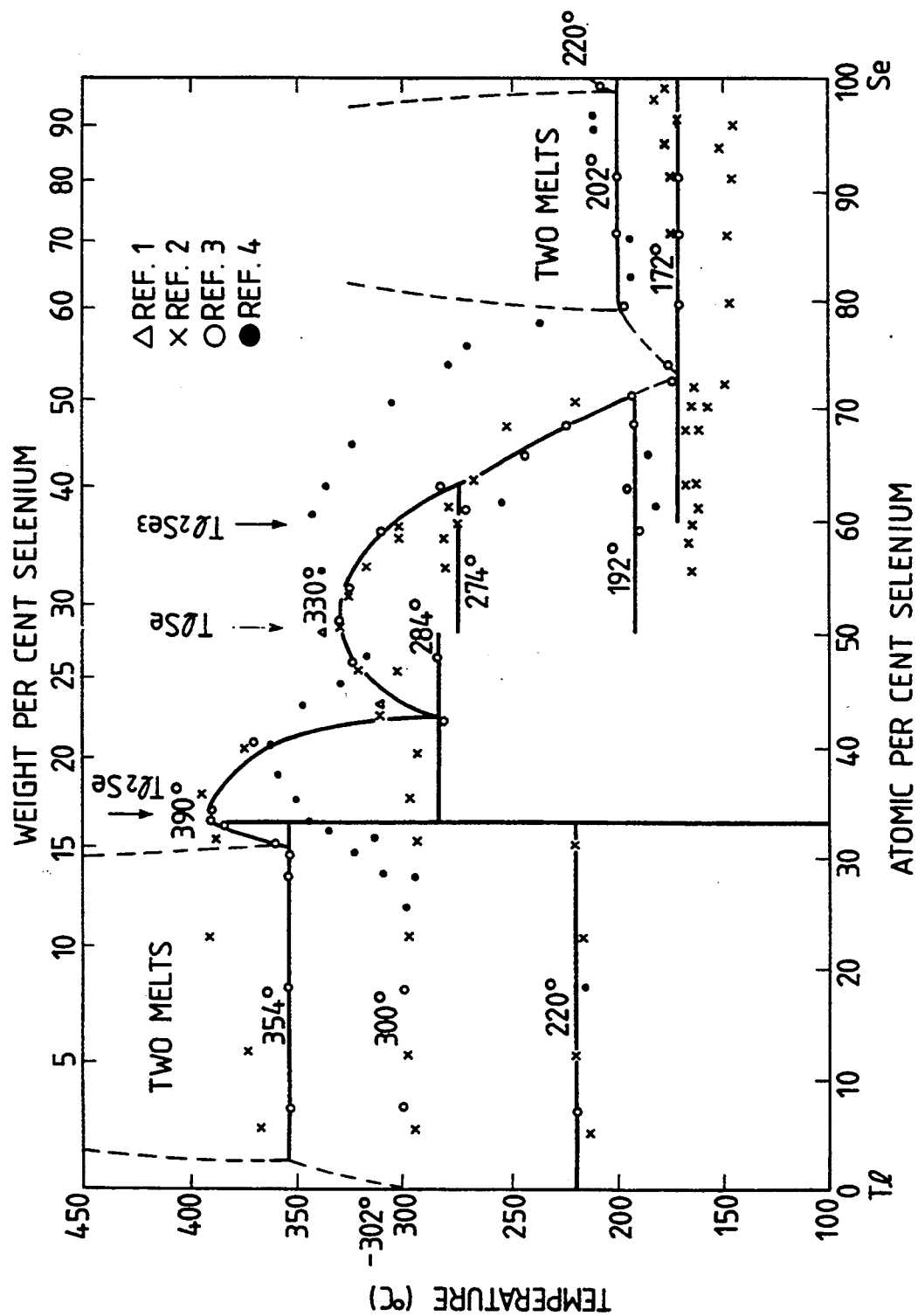
Figure 17:
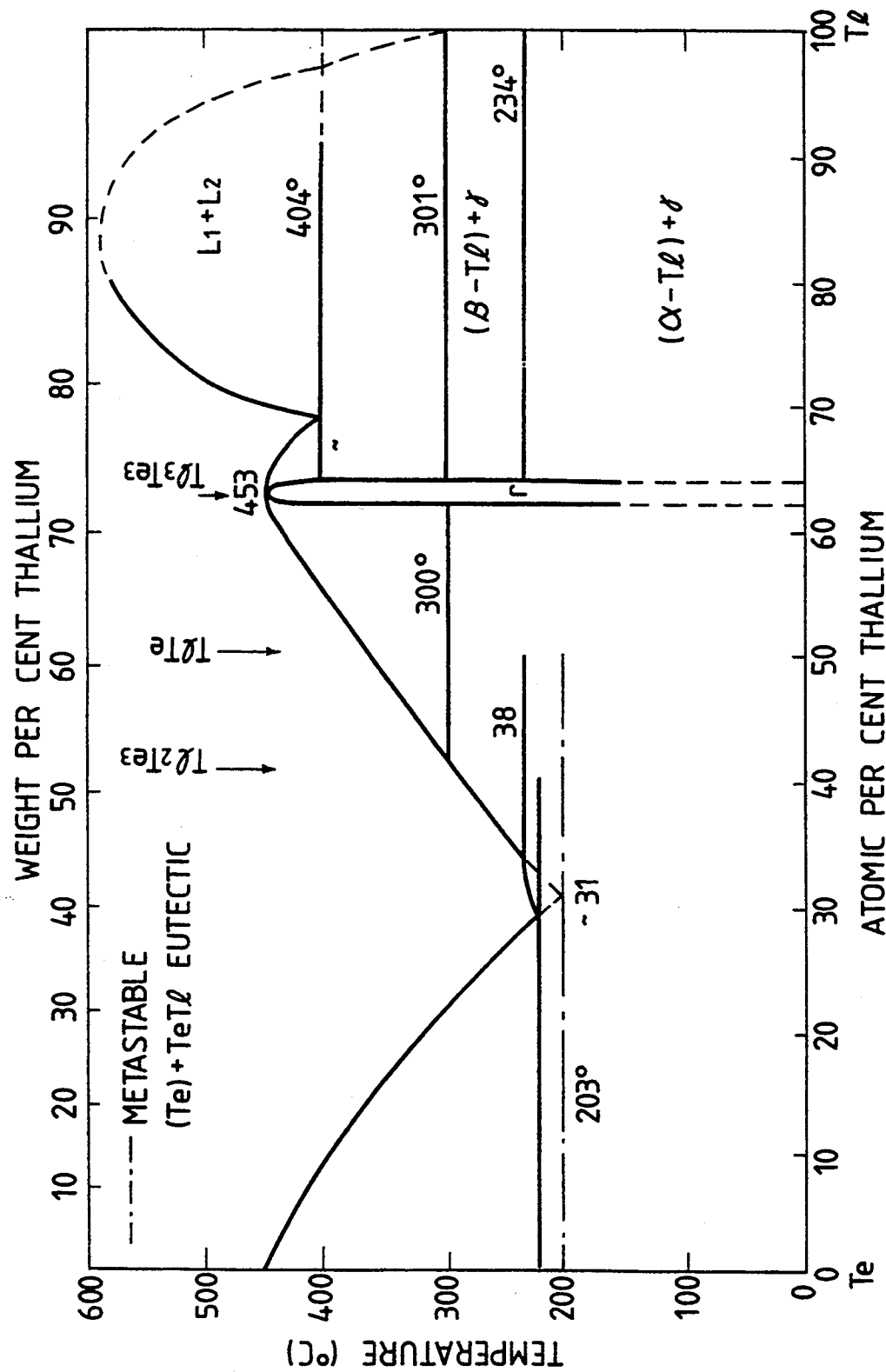
Figure 18:
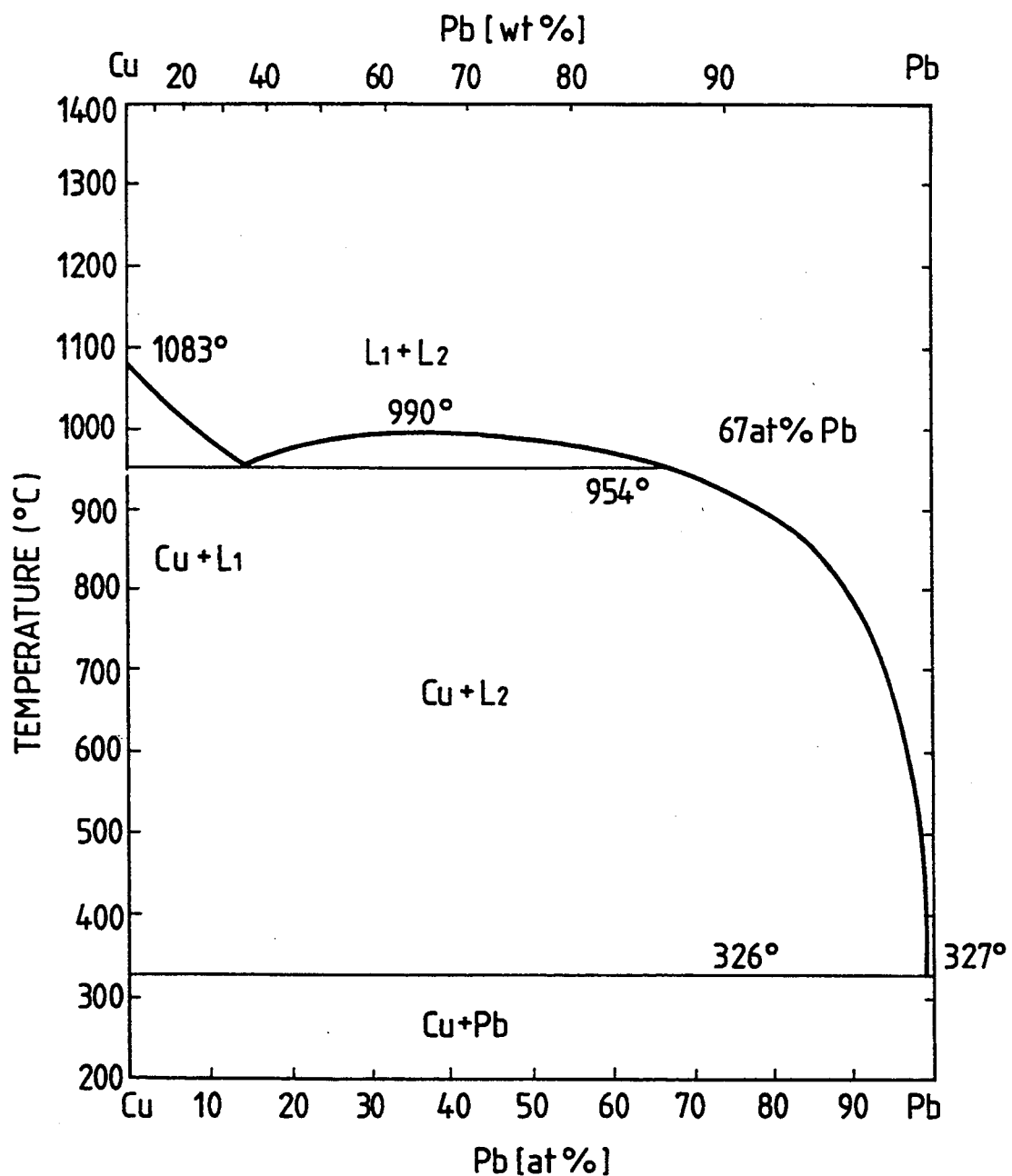
Figure 19:
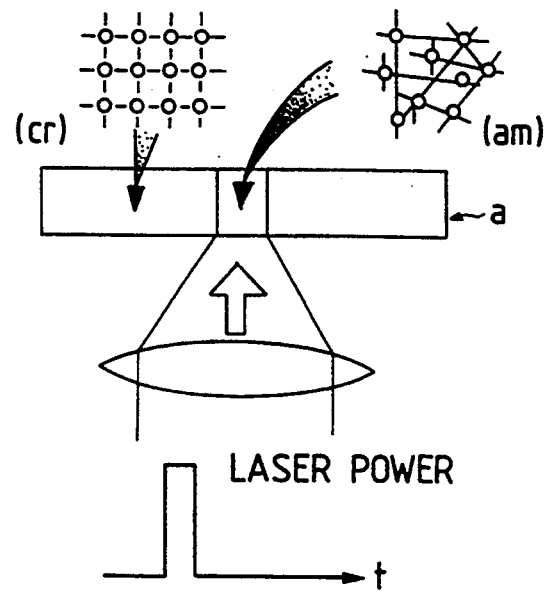
FIGS. 19 and 20 are views for explaining the principle of writing/erasing in the "phase changing system".
Figure 20:
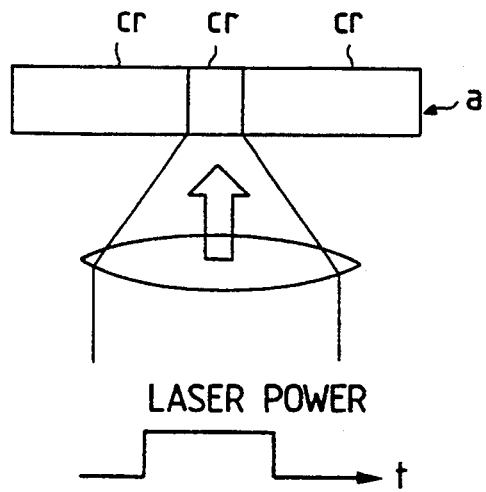

Any suitable composition can be used as the composition applicable to the present invention, if the composition is composed of a plurality of elements and can selectively take one of the two states, namely, "the single phase state" and "the two-phase coexistence state", as the melt state, as described above. Examples of the applicable composition are the following compositions in which it is confirmed from the state views of FIGS. 4 through 18 that the respective composition can selectively take the single phase state and the two-phase coexistence state as the melt state: two-element or three-element compositions such as Zn—Bi (0.6–63 at % ... see FIG. 4), Sb—Se (17–40 at % ... see FIG. 5), Zn—Pb (0.3–94 at % W ... see FIG. 6), Al—In (4.7–89 at % ... see FIG. 7), Bi—Ga (38.5–91.5 at % ... see FIG. 8), Bi—Se (72–98 at % ... see FIG. 9), Ga—Tl (1.2–95.5 at % ... see FIG. 10), In—Se (5–32 at % and 65–95 at % ... see FIG. 11), In—Te (3–28 at % ... see FIG. 12), Pb—Se (76.8–98.8 at % ... see FIG. 13), Sb—S (5.5–57 at % and 62–90 at % ... see FIG. 14), Sn—Se (16–48 at % ... see FIG. 15), Tl—Se (2–30 at % ... see FIG. 16), Te—Tl (69–92 at % ... see FIG. 17), Cu—Pb (14.7–67 at % ... see FIG. 18), etc. Numerical values given in parentheses express the rate of the latter element to the former element.

The optical recording medium using selected one of the aforementioned recording materials is substantially constituted by a transparent substrate and a recording material layer formed on a surface of the substrate.

A protective layer may be provided on the recording material layer for the purpose of preventing the melted recording material layer from deforming before solidification or for the purpose of preventing the mechanical injury, oxidation, etc. of the recording material layer.

A resin material such as acryl, polycarbonate, epoxy, etc., as well as glass, may be used as the transparent substrate. In the case where such a resin material is used as the substrate, a substrate protecting layer constituted by a composition such as $SiO_2$, ZnS, $ZrO_2$, etc. or a mixture thereof may be provided between the recording material layer and the substrate to prevent the thermal injury of the resin material. In the optical recording medium of the type in which writing/reproducing/erasing is carried out by radiating a light beam from the opposite side of the substrate, the substrate may be, of course, constituted by an opaque material such as aluminum.

Examples of the material for forming the protective layer are the same materials as those for forming the substrate protecting layer, resin materials such as ultraviolet-setting resin, acryl, polycarbonate, epoxy, etc., glass materials, and the like. The protective layer may be constituted by a single layer of one of these materials or may be constituted by a mixture layer formed by laminating a plurality of materials selected from these materials. To improve cooling speed, a heat diffusion layer constituted by a metal having high heat conductivity such as Au, Al, Ag, etc., and/or a heat conduction control layer constituted by a material having heat conductivity decreasing with the increase of temperature such as Si, Ge, GaAs, BeO, AlN, TiC, Cr, Fe, Rh, Be, Ir, etc. or the like may be provided.

Further, a sputtering technique or an evaporating deposition technique can be used as a method for forming the recording material layer. That is, a simultaneous sputtering technique for sticking a target composition to the substrate simultaneously with synthesizing compositions from a plurality of targets by suitably adjusting the quantities of electric power respectively applied to the plurality of targets may be used as the sputtering technique, or a sputtering technique using one alloy target corresponding to a target composition may be used. A co-evaporating deposition technique for sticking a target composition to the substrate simultaneously with obtaining the target composition from a plurality of evaporation sources by adjusting respective evaporating speeds may be used as the evaporating deposition technique.

Figure 3A:
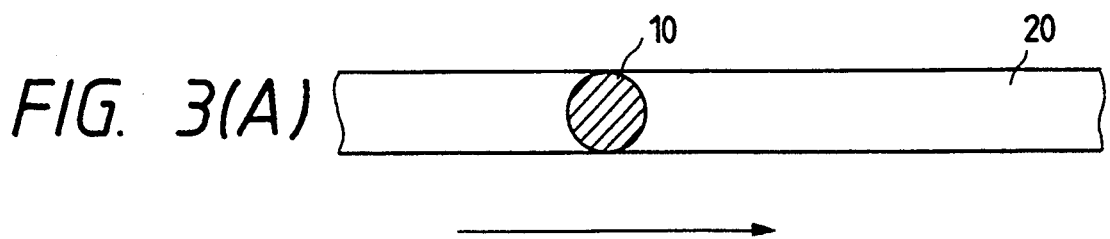
FIG. 3(A) is a view for explaining a "one-beam" overwrite system.

Next, a specific means for performing an optical recording through the rapid cooling will be described hereunder. As an example of the means, as shown in FIG. 3(A), used is a method in which a single circular writing/erasing beam 10, the output power of which is switched selectively, is radiated to a recording material layer 20. That is, an overwrite system using a "single beam" can be used as follows: an amorphous portion of the recording material layer 20 is formed by rapidly cooling the recording material layer 20 after melting the recording material layer 20 at a high temperature (higher than a temperature $T_L$ in the state view of FIG. 2) through radiation of a high-power beam and then heating the recording material layer to a temperature, for example, temperature $T_2$ to adjust the melt state thereof to a single phase state; and, on the other hand, an amorphous portion of the recording material layer 20 is formed by rapidly cooling the recording material layer 20 after melting the recording material layer 20 at a low temperature (in a range of from a temperature $T_S$ to the temperature $T_L$ in the state view of FIG. 2) through radiation of a low-power beam and then heating the recording material layer to a temperature, for example, temperature $T_1$ to adjust the melt state thereof to a two-phase coexistence state.

Figure 3B:
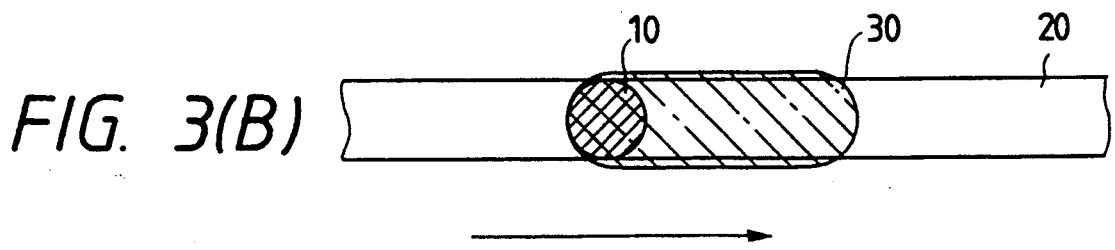
FIG. 3(B) is a view for explaining a "two-beam" overwrite system.

As an example of the technique for performing an optical recording through the gradual cooling treatments, as shown in FIG. 3(B), used is a two-beam system in which both a circular writing/erasing beam 10, the output power of which is switched selectively, and a low-power ellipsoidal auxiliary beam 30 suitably positioned with respect to the beam 10 are radiated to the recording material layer 20. That is, an overwrite system using "two beams" can be used as follows: a crystallized portion of the recording material layer 20 is formed by gradually cooling the recording material layer 20 through radiation of the ellipsoidal auxiliary beam 30 after melting the recording material layer 20 at a high temperature (higher than the temperature $T_L$ in the state view of FIG. 2) through radiation of the high-power circular beam 10 and then heating the recording material layer to a temperature $T_2$ to adjust the melt state thereof to a single phase state; and, on the other hand, a crystallized portion of the recording material layer 20 is formed by gradually cooling the recording material layer 20 through radiation of the ellipsoidal auxiliary beam 30 after melting the recording material layer 20 at a low temperature (in a range of from the temperature $T_S$ to the temperature $T_L$ in the state view of FIG. 2) through radiation of the low-power circular beam 10 and then heating the recording material layer to the temperature $T_1$ to adjust the melt state thereof to a two-phase coexistence state.

By adjusting the cooling conditions in the respective states, an amorphous or crystalline portion can be formed from the single phase recording material layer and, on the other hand, an amorphous or crystalline portion can be formed from the two-phase coexistence recording material layer. Accordingly, a reflectivity difference caused by a initial state difference and a phase changing state difference is produced between the amorphous or crystalline portion formed from the single phase recording material layer and the amorphous or crystalline portion formed from the two-phase coexistence recording material layer. As a result, a signal having four values at the maximum can be attained by using such four kinds of reflectivity in combination.

For example, four phase states can be established by selectively switching the power of the circular beam 10 and the timing of radiation of the auxiliary beam 30 by utilizing the "two-beam" overwrite system. That is, a signal having four values at the maximum can be attained by using in combination the reflectivity of the amorphous phase state (i) formed from the single phase recording material layer 20 through radiation of only the high-power circular beam 10, the reflectivity of the amorphous phase state (ii) formed from the two-phase coexistence recording material layer 20 through radiation of only the low-power circular beam 10, the reflectivity of the crystallized phase state (iii) formed from the single phase recording material layer 20 through radiation of both the high-power circular beam 10 and the low-power ellipsoidal auxiliary beam 30 and the reflectivity of the crystallized phase state (iv) formed from the two-phase coexistence recording material layer 20 through radiation of both the low-power circular beam 10 and the low-power ellipsoidal auxiliary beam 30.

Examples of the present invention will be described hereunder in detail with reference to the drawings.

First Example

Figure 1:
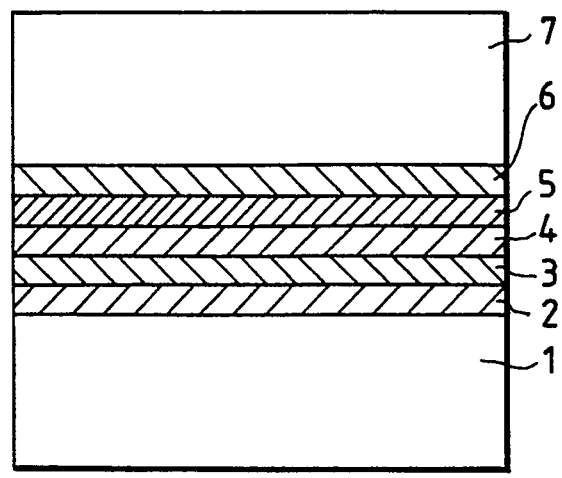
FIG. 1 is a sectional view showing the structure of an optical recording medium of the present invention.

As shown in FIG. 1, an optical recording medium of this example has, as main parts, a 1.2 mm-thick substrate 1 made of acrylic resin, a 100 nm-thick substrate protecting layer 2 made of SiO$_2$ and formed on the substrate 1 by an RF magnetron sputtering technique, a 100 nm-thick recording material layer 3 made of Zn—Pb and formed on the substrate protecting layer 2 by the same RF magnetron sputtering technique, a 200 nm-thick protective layer 4 made of SiO$_2$ and formed on the recording material layer 3 by the same technique, a 200 nm-thick cooling layer 5 made of Al and provided on the protective layer 4, and a 1.2 mm-thick protective plate 7 made of acrylic resin and laminated on the cooling layer 5 through an adhesive layer 6 of ultraviolet-setting resin.

Light absorption in this optical recording medium was in a range of from visible light to near-infrared light, so that this medium could be used as an optical recording medium in a range of from 400 nm to 860 nm.

A four-value signal recording method using this optical recording medium and a "two-beam" overwrite system as shown in FIG. 3(B) in combination will be described hereunder. First, the optical recording medium was initialized by uniformly radiating 780 nm semiconductor laser light while rotating the optical recording medium at a speed of 1800 rpm.

Then, a four-value signal was recorded by an overwrite system comprising the steps of: rotating the initialized optical recording medium at a speed of 1800 rpm; and selectively radiating a circular beam 10, the output of which is selectively switched (30 mW at the time of high power, 15 mW at the time of low power) and an ellipsoidal auxiliary beam 30 of low power (10 mW) while the optical recording medium was rotated.

That is, a four-value signal was recorded as follows: a single phase amorphous portion of the recording material layer 3 in the optical recording medium was formed as a signal 1 by rapidly cooling the recording material layer 3 after melting the recording material layer 3 under the condition of high temperature through radiating only the high-power circular beam 10 to the recording material layer 3; a two-phase coexistence amorphous portion of the recording material layer 3 was formed as a signal 2 by rapidly cooling the recording material layer 3 after melting the recording material layer 3 under the condition of low temperature through radiating only the low-power circular beam 10 to the recording material layer 3; a single phase crystallized portion of the recording material layer 3 was formed as a signal 3 by gradually cooling the recording material layer 3 with radiation of the auxiliary beam 30 after melting the recording material layer 3 under the condition of high temperature through radiating both the high-power circular beam 10 and the low-power ellipsoidal auxiliary beam 30 to the recording material layer 3; a two-phase coexistence crystallized portion of the recording material layer 3 was formed as a signal 4 by gradually cooling the recording material layer 3 with radiation of the auxiliary beam 30 after melting the recording material layer 3 under the condition of low temperature through radiating both the low-power circular beam 10 and the low-power ellipsoidal auxiliary beam 30 to the recording material layer 3.

On the other hand, a laser beam with power of 1 mW was radiated to the recording material layer 3 while the optical recording medium having information written was rotated at a speed of 1800 rpm, so that the information recorded thereon was reproduced by reading the reflected beam through a light-receiving element.

Because a four-value signal can be recorded by the optical recording method using the aforementioned optical recording medium and the "two-beam" overwrite system in combination as related to this example, not only the amount of information stored in one optical recording medium is increased remarkably but the transfer rate thereof is increased. At the same time, the history before rewriting is completely erased because the recording material is always melted at the time of information erasing. Accordingly, the method in this example has an advantage in that an improvement in erasability and C/N ratio can be attained.

Second Example

Figure 4:
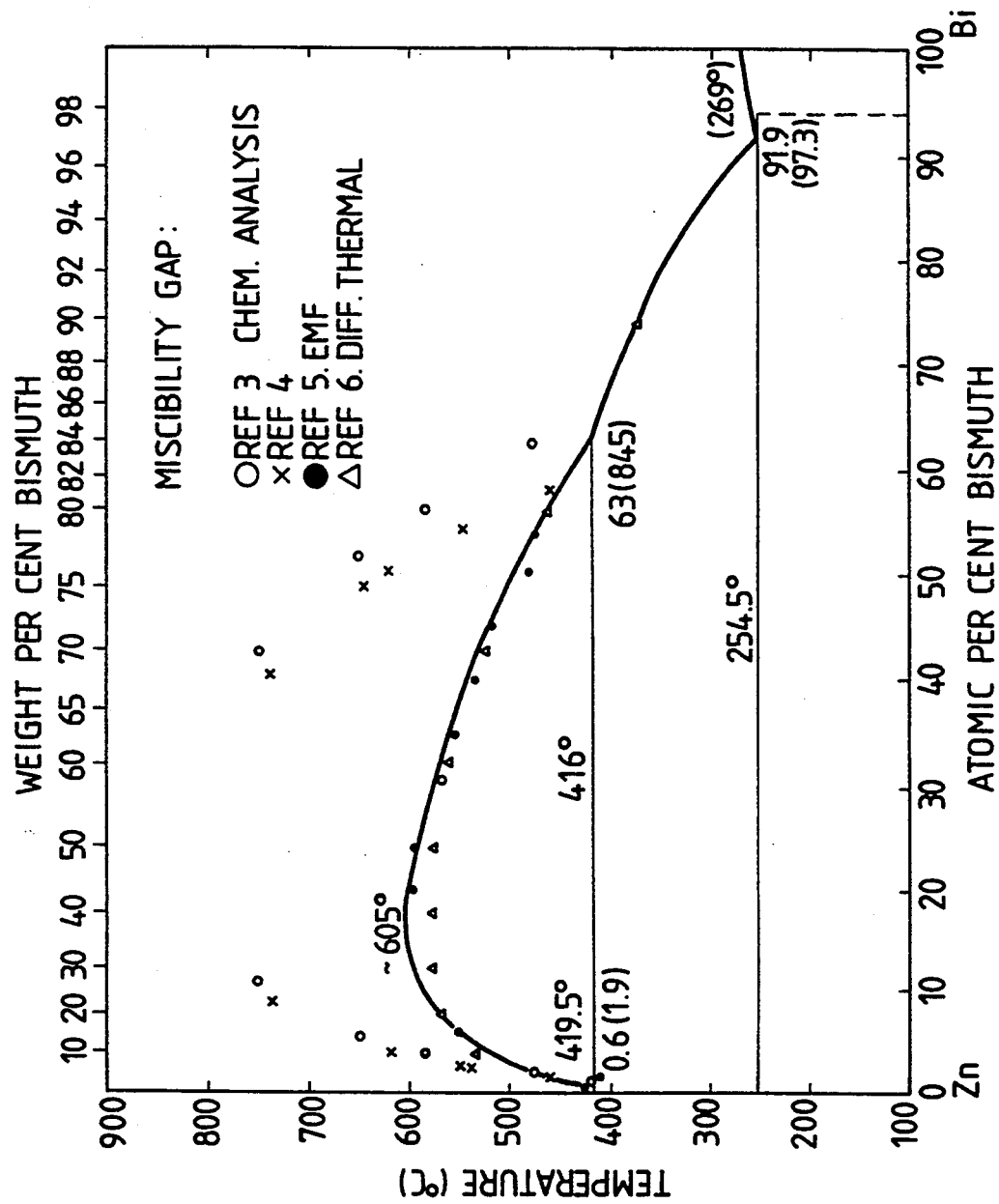
FIGS. 4 through 18 are pseudo two-element phase diagrams of compositions adapted to the present invention.

An optical recording medium used in this example is similar to the optical recording medium of the first example, except that the recording material layer 3 is constituted by $Bi_{20}Zn_{80}$ as a two-element material of Zn—Bi as shown in the state drawing of FIG. 4.

Light absorption in this optical recording medium is similar to that in the first example and is in a range of from visible light to near-infrared light, so that this medium can be used as an optical recording medium in a range of from 400 nm to 860 nm.

A high-speed recording method using this optical recording medium and a "one-beam" overwrite system as shown in FIG. 3(A) in combination will be described hereunder. First, the optical recording medium was initialized to change the recording material layer 3 to a uniform amorphous phase by uniformly radiating 780 nm semiconductor laser light while rotating the optical recording medium at a speed of 1800 rpm.

Then, a high-speed recording was carried out by an overwrite system comprising the steps of: rotating the initialized optical recording medium at a speed of 1800 rpm; and selectively radiating a circular beam 10, the output of which is selectively switched (30 mW at the time of high power, 20 mW at the time of low power) while the optical recording medium was rotated.

That is, a high-speed recording was carried out as follows: a single phase amorphous portion of the recording material layer 3 in the optical recording medium was formed as a recording state by rapidly cooling the recording material layer 3 after melting the recording material layer 3 under the condition of high temperature (605° C. or above as shown in the state drawing of FIG. 4) through radiating the high-power circular beam 10 to the recording material layer 3; and a two-phase coexistence amorphous portion of the recording material layer 3 was formed as an erasing state by rapidly cooling the recording material layer 3 after melting the recording material layer 3 under the condition of a low temperature (from 415° C. to 605° C. as shown in the state drawing of FIG. 4) through radiating the low-power circular beam 10 to the recording material layer 3.

The fact that the recording material layer 3 was in an amorphous state was confirmed by an electron-ray diffraction technique. In general, a halo pattern is observed as the diffraction pattern when the recording material is in an amorphous state, whereas a ring or a ring blotch is observed when it is in a crystallized state. In this example, a halo pattern was observed as the diffraction pattern in the two cases of the recording state and the erasing state. Accordingly, the fact that the recording material layer was in an amorphous state in the two cases of the recording state and the erasing state was confirmed.

In the optical recording method as related to this example, the recording material layer 3 in a single phase state was changed to an amorphous state to correspond to a recording state and, on the other hand, the recording material layer 3 in a two-phase coexistence state was changed to an amorphous state to correspond to an erasing state. Accordingly, the writing/erasing time was reduced to 60 ns or less, so that remarkable improvement in writing/erasing rate was attained compared with the conventional method. Further, the history before rewriting was completely erased because the recording material was always melted at the time of information writing/erasing. Accordingly, the erasability of 25 dB or more and the C/N ratio of 45 dB or more were attained as values suitable for practical use.

On the other hand, crystallizing temperatures of the two kinds of amorphous phases in this optical recording medium were measured, where the crystallizing temperature was defined as a temperature at which a rapid change of the reflection rate started when the reflection rate was monitored while heating the recording material layer 3. As a result, each of the crystallizing temperatures was 120° C. or higher, so that the stability of the amorphous phase was sufficient.

Further, a test in which information was rewritten $10^4$ times was made. As a result, abnormal phenomena such as segregation of the recording material did not occur, so that remarkable deterioration in the recording characteristic was not observed.

Third Example

An optical recording medium used in this example is similar to the optical recording medium of the first example, except that the recording material layer 3 is constituted by Bi—Ga.

Light absorption in this optical recording medium is similar to that in the first example and is in a range of from visible light to near-infrared light, so that this medium can be used as an optical recording medium in a range of from 400 nm to 860 run.

A recording method using this optical recording medium and a "two-beam" overwrite system as shown in FIG. 3(B) in combination to keep a recording state for a long time will be described hereunder. First, the optical recording medium was initialized to change the recording material layer 3 to a uniform crystalline phase by uniformly radiating 780 nm semiconductor laser light while rotating the optical recording medium at a speed of 1800 rpm.

Then, a recording was carried out by an overwrite system comprising the steps of: rotating the initialized optical recording medium at a speed of 1800 rpm; and selectively radiating a circular beam 10, the output of which is selectively switched (25 mW at the time of high power, 18 mW at the time of low power) and an ellipsoidal auxiliary beam 30 of low power (12 mW) while the optical recording medium was rotated.

That is, a writing/erasing was carried out as follows: the recording material layer 3 in the optical recording medium was crystallized to form a single phase crystallized portion corresponding to a recording state by gradually cooling the recording material layer 3 through the auxiliary beam 30 after melting the recording material layer 3 under the condition of a high temperature through radiating both the high-power circular beam 10 and the ellipsoidal auxiliary beam 30 to the recording material layer 3; and the recording material layer 3 was crystallized to form a two-phase coexistence crystallized portion corresponding to an erasing state by gradually cooling the recording material layer 3 through the auxiliary beam 30 after melting the recording material layer 3 under the condition of low temperature through radiating both the low-power circular beam 10 and the ellipsoidal auxiliary beam 30 to the recording material layer 3.

The fact that the recording material layer 3 was in a crystallized state was confirmed by an electron-ray diffraction technique.

In the optical recording method as related to this example, the recording material layer 3 in a single phase state was crystallized to form a crystallized state corresponding to a recording state and, on the other hand, the recording material layer 3 in a two-phase coexistence state was crystallized to form a crystallized state corresponding to an erasing state. Accordingly, the amorphous region different in energy level from the crystalline region did not coexist with the latter in the recording material layer 3, so that the recording state could be reserved for a long time. Further, the history before rewriting was completely erased because the recording material was always melted at the time of information writing/erasing. Accordingly, there arose advantages that the erasability and the C/N ratio were improved.

Further, a test in which information was rewritten $10^4$ times was made. As a result, abnormal phenomena such as segregation of the recording material did not occur, so that remarkable deterioration in the recording characteristic was not observed.

Fourth Example

An optical recording medium used in this example is similar to the optical recording medium of the first example, except that the optical recording medium this example has no cooling layer and that the recording material layer 3 is constituted by $Sb_{65}Se_{35}$ being high in the crystallizing speed.

Light absorption in this optical recording medium is similar to that in the first example and is in a range of from visible light to near-infrared light, so that this medium can be used as an optical recording medium in a range of from 400 nm to 860 nm.

A recording method using this optical recording medium and a "two-beam" overwrite system as shown in FIG. 3(B) in combination to keep a recording state for a long time and make high-speed recording possible will be described hereunder. First, the optical recording medium was initialized to change the recording material layer 3 to a uniform crystalline phase by uniformly radiating 780 nm semiconductor laser light while rotating the optical recording medium at a speed of 1800 rpm.

Then, a recording was carried out by an overwrite system comprising the steps of: rotating the initialized optical recording medium at a speed of 1800 rpm; and selectively radiating a circular beam 10, the output of which is selectively switched (25 mW at the time of high power, 18 mW at the time of low power) while the optical recording medium was rotated.

That is, a writing/erasing was carried out as follows: the recording material layer 3 in the optical recording medium was crystallized to form a single phase crystallized portion corresponding to a recording state by rapidly cooling the recording material layer 3 after melting the recording material layer 3 under the condition of high temperature through radiating the high-power circular beam 10 to the recording material layer 3; and the recording material layer 3 was crystallized to form a two-phase coexistence crystallized portion corresponding to an erasing state by rapidly cooling the recording material layer 3 after melting the recording material layer 3 under the condition of low temperature through radiating the low-power circular beam 10 to the recording material layer 3.

The fact that the recording material layer 3 was in a crystallized state was confirmed by an electron-ray diffraction technique.

In the optical recording method as related to this example, the recording material layer 3 in a single phase state was crystallized by rapid cooling to form a crystallized state corresponding to a recording state and, on the other hand, the recording material layer 3 in a two-phase coexistence state was crystallized by rapid cooling to form a crystallized state corresponding to an erasing state. Accordingly, a remarkable improvement in writing/erasing speed was attained. Further, the amorphous region different in energy level from the crystalline region did not coexist with the latter in the recording material layer 3, so that the recording state could be reserved for a long time. Further, the history before rewriting was completely erased because the recording material was always melted at the time of information writing/erasing. Accordingly, there arose advantages that the erasability and the C/N ratio were improved.

Further, a test in which information was rewritten $10^4$ times was made. As a result, abnormal phenomena such as segregation of the recording material did not occur, so that remarkable deterioration in the recording characteristic was not observed.

As described above, according to the first aspect of the present invention, the recording material includes a composition being composed of a plurality of elements and being capable of taking, as a melt state thereof, a selected one of a single phase state and a two-phase coexistent state. Accordingly, a reflectivity difference caused by an initial state difference is produced between the amorphous or crystalline portion formed from the single phase recording material layer and the amorphous or crystalline portion formed from the two-phase coexistence recording material layer. Thus, there arises an effect that optical recording can be made by utilizing the reflectivity difference.

According to the second aspect of the present invention, an amorphous or crystalline portion is formed from the single phase recording material layer and, on the other hand, an amorphous or crystalline portion is formed from the two-phase coexistence recording material layer, by adjusting the conditions for the respective cooling treatments. Further, a reflectivity difference caused by an initial state difference and a phase changing state difference is produced between the amorphous or crystalline portion formed from the single phase recording material layer and the amorphous or crystalline portion formed from the two-phase coexistence recording material layer. As a result, a signal having four values at the maximum can be attained by using such four kinds of reflectivity in combination. Further, the history before rewriting can be completely erased because the recording material is always melted at the time of information writing/erasing. Accordingly, there arises an effect that not only an increase in the amount of information stored in one optical recording medium and an improvement in transfer rate can be attained but an improvement in erasability and C/N ratio can be attained.

According to the third aspect of the present invention, information writing/erasing can be made at a high speed by rapidly cooling the recording material layer; and the history before rewriting can be completely erased because the recording material is always melted at the time of information writing/erasing. Accordingly, there arises an effect that not only the recording time for rewriting can be shortened but an improvement in erasability and C/N ratio can be made.

According to the fourth aspect of the present invention, the recording state can be reserved for a long time because the amorphous region different in energy level from the crystalline region does not coexist with the latter in the recording material layer; and the history before rewriting can be completely erased because the recording material is always melted at the time of information writing/erasing. Accordingly, there arises an effect that not only an improvement in stability of reservation of recorded information can be attained but an improvement in erasability and C/N ratio can be attained.

According to the fifth aspect of the present invention, information writing/erasing can be made at a high speed by rapidly cooling the recording material layer; the recording state can be reserved for a long time because the amorphous region different in energy level from the crystalline region does not coexist with the latter in the recording material layer; and the history before rewriting can be completely erased because the recording material is always melted at the time of information writing/erasing. Accordingly, there arises an effect that not only reduction of the scanning time for rewriting and an improvement in stability of reservation of recorded information can be attained but an improvement in erasability and C/N ratio can be attained.

We claim:

1. An optical recording medium comprising a layer of recording material provided on a substrate, said material having an optical property which is changed reversibly by means of light or heat so that writing and/or reproducing or writing, reproducing, and/or erasing of information is performed by using the reversible change of the optical property of said recording material layer, wherein said recording material includes a composition being composed of a plurality of elements and taking, as a melt state thereof, a selected one of a single phase state in which the plurality of elements are uniformly mixed in a temperature range of a liquid phase and a two-phase coexistent state in which the plurality of elements are not uniformly mixed in a temperature range of a solid phase.

2. An optical recording method for performing writing, reproducing, and/or erasing of information by using a reversible change of an optical property of a layer of recording material provided on a substrate caused by means of light or heat, the method comprising the steps of:
preparing said recording material as a composition being composed of a plurality of elements and taking, as a melt state thereof, a selected one of a single phase state in which the plurality of elements are uniformly mixed in a temperature range of a liquid phase and a two-phase coexistent state in which the plurality of elements are not uniformly mixed in a temperature range of a solid phase;
forming a first phase-changed portion corresponding to a recording state or an erasing state by irradiating said recording material layer with a high-power light beam so as to melt the layer into the single phase state and then by cooling said melted layer, wherein the single phase state is either one of an amorphous single phase state or a crystalline single phase state; and forming a second phased-changed portion corresponding to an erasing state or a recording state by irradiating said recording material layer with a low-power light beam so as to melt the layer into the two-phase coexistence state and then by cooling said melted layer, wherein the two-phase coexistence state is either one of an amorphous two-phase coexistence state or a crystalline two-phase coexistence state.

3. An optical recording method as claimed in claim 2, wherein said first phase-changed portion is an amorphous portion formed by rapidly cooling said melted layer in the single phase state, and wherein said second phase-changed portion is an amorphous portion formed by rapidly cooling said melted layer in the two-phase coexistence state.

4. An optical recording method as claimed in claim 2, wherein said first phase-changed portion is a crystallized portion formed by gradually cooling said melted layer in the single phase state, and wherein said second phase-changed portion is a crystallized portion formed by gradually cooling said melted layer in the two-phase coexistence state.

5. An optical recording method as claimed in claim 2, wherein said composition of said recording material has a high crystallizing speed, wherein said first phase-changed portion is a crystallized portion formed by rapidly cooling said melted layer in the single phase state, and wherein said second phase-changed portion is a crystallized portion formed by rapidly cooling said melted layer in the two-phase coexistence state.

* * * * *